United States Patent [19]

Bjork

[11] 4,052,901

[45] Oct. 11, 1977

[54] LEVEL DETECTING

[76] Inventor: Albion P. Bjork, Tower Road, Lincoln, Mass. 01773

[21] Appl. No.: 709,796

[22] Filed: July 29, 1976

[51] Int. Cl.² .................... G01L 1/20; H01C 3/06; H01C 3/10
[52] U.S. Cl. .................... 73/313; 73/398 AR; 338/33; 338/36
[58] Field of Search .................... 73/304 R, 299, 301, 73/398 AR; 340/246, 244 C; 338/314, 211, 210, 33, 34, 35, 36, 280

[56] References Cited

U.S. PATENT DOCUMENTS

| 2,758,256 | 8/1956 | Eisler | 338/314 X |
|---|---|---|---|
| 3,433,073 | 3/1969 | Kunert | 73/313 |
| 3,511,090 | 5/1970 | Ehrenfried et al. | 73/301 |
| 3,513,701 | 5/1970 | Soltanoff | 73/301 |
| 3,541,491 | 11/1970 | Worster | 338/211 |
| 3,777,177 | 12/1973 | Norkum et al. | 73/304 R |
| 3,820,958 | 6/1974 | Cheng et al. | 338/34 |
| 3,946,177 | 3/1976 | Carrico | 73/313 |

Primary Examiner—Daniel M. Yasich
Attorney, Agent, or Firm—Jerry Cohen

[57] ABSTRACT

Liquid level detection apparatus and other apparatus comprising in common an elongated flexible substrate transducer which can extend into a liquid containing vessel or be applied to other pressure or force measurement tasks and provide an accurate indication of liquid level or other pressure or force related parameter through a voltage drop measurement made through an elongated, e.g., sinuous or other regular pattern (or of irregular patterning to localize areas of highest sensitivity) conductor pattern contained in the transducer which is shorted out in the portion thereof subjected to a predetermined pressure, the elongated conductor being on facing portions of a folded sheet substrate material which has an inherent spring characteristic (resilience) and/or geometrical-arrangement-loading such that the portion thereof subjected to such pressure has butting face portions and the portion thereof not subjected to such pressure is separated due to the spring characteristic of the folded sheet material. For instance, as applied to liquid level measurement, the folded substrate is in elongated ribbon form and the portion below liquid level is subjected to liquid pressure sufficient to move the two facing portions in butting engagement causing elongated conductor patterns thereon to short out at liquid level.

9 Claims, 8 Drawing Figures

LEVEL DETECTING

BACKGROUND OF THE INVENTION

The present invention relates to level detection and is particularly characterized by high precision, consistent with low cost, transducer apparatus.

The state of the art of a fluent material level measuring apparatus includes tapes which extend into a tank from the top and comprise a central conductor with insulating flanges at its edges around which are wrapped a spiral strip of nichrome wire or the like. A constant current source supplies current through the central strip with a return through the spiral and the portion of the tape below the liquid level is shorted out by pressing of the spiral against the central conductor. The state of the art also comprises optical sensors, other resistance and conductive probes and potentiometric floats and other means for detecting the change of liquid level within a liquid container. Such measurement apparatus is used in connection with monitoring wells, storage tanks for oil, and other industrial and agricultural liquids and the like.

It is an important object of the present invention to provide improvement in the precision of such instrumentation.

It is a further object of the invention to provide compactness of the elongated transducer element used in such apparatus consistent with the preceding object.

It is a further object of the invention to provide modularity of transducer elements to suit different measurement depths with a single, or limited number of, model(s), consistent with one or more of the preceding objects.

Further objects are to provide gauge pressure and/or hydraulic head measurement, sensitivity variation with localization of highest sensitivity in region of greatest need, commonality of apparatus to other force- or pressure-related parameter measurements, and/or modularity consistent with one or more of the preceding objects.

It is a further object of the invention to provide low cost consistent with one or more of the preceding objects.

SUMMARY OF THE INVENTION

In accordance with the invention, a flexible transducer is provided of elongated length which comprises a sheet form material having a spring characteristic (resilience) and/or geometric loading such that when folded lengthwise the folded portions tend to spring apart. This tendency is overcome in the portion of the folded sheet material below liquid level by pressure of the liquid on the backs (outer surfaces) of the folded portions. An extended length conductive path of sinuous or zig-zag form is provided on each of the folded portion faces so that when the two face portions are butted together under pressure, there is an interception, reliably attained, of Xs, all up and down under liquid level height, due to the pressure head, thereby insuring a reliable shorting out of the portion below the liquid surface. The ends of the conductive paths are connected to a constant current electrical power supply and a voltmeter is provided to measure voltage drop down the conductive length of the two folded portions to the beginning of the shorted out portion and the voltage drop is a function of height above liquid level.

The invention can also be modified to provide a measure of gauge pressure in a gaseous (e.g., steam, air or other gasses) environment and to other weight and force measurements and variations of basic liquid level measurement.

Other features, aspects and advantages of the invention will be apparent from the following detailed description of preferred embodiments thereof, taken in connection with the accompanying drawing, in which:

BRIEF DESCRIPTION OF THE DRAWING

FIG. 1B is a plan of a preferred zig-zag pattern;

DETAILED DESCRIPTION OF PREFERRED EMBODIMENTS

Figure 1:
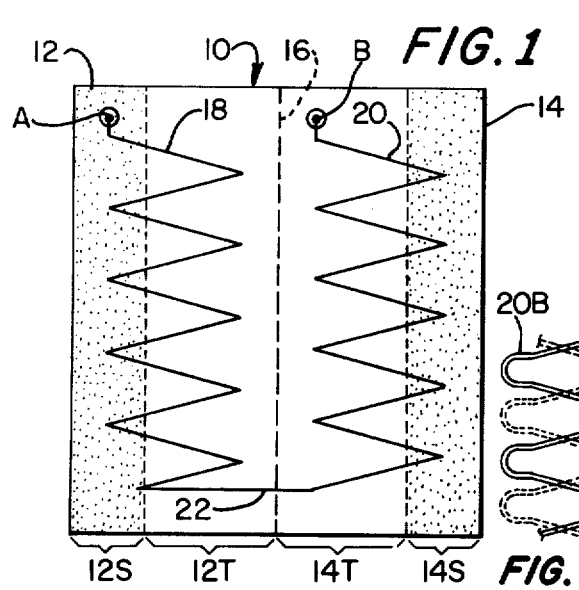
FIG. 1 is a plan view of a portin of springy transducer sheet material substrate having conductors thereon before lamination, in accordance with a preferred embodiment of the invention, before folding
Figure 1A:
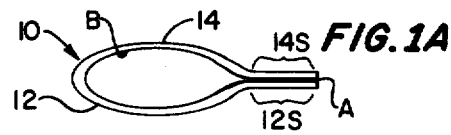
FIG. 1A is a view of the material when folded.

Referring now to FIGS. 1 and 1A, there is shown a web form sheet material 10 having two portions 12 and 14 symmetrical about an elongated lengthwise fold line indicated by dash line 16 and having portions 12S and 14S which will touch when the sheet 10 is folded without application of external pressure. Elongated zig-zag conductors 18 and 20 are provided on the respective portions 12 and 14 by vacuum metallizing through a screen, by vacuum metallizing an entire sheet and etching away all but the conductive path portions or by screening conductive paints. One or both of the conductors, preferably both, can have the zig-zag form (including sinuous or other variations) to insure intersection thereof when butting without critical alignment but not in the regions 12S and 14S. When fluid pressure is applied to the backsides of the folded sheets then they will butt in the regions 12T and 14T and the conductors 18 and 20 will intersect. The conductors 18 and 20 can be elongated in zig-zags of regular periodic form of a linear formula or non-linear (e.g., of exponential formula) to provide localized high sensitivity in a preselected region of greatest need.

As best shown in FIG. 1A, springy loading due to resilience of the material is supplemented by geometric loading through the bowed type fold shown.

Instead of relying on fluid pressure to make the regions 12T, 14T touch, magnetic flings can be placed therein and a magnet carried on a float at liquid level can force the closure (a stiff tube being provided around the folded transducer 10 to prevent fluid pressure per se from forcing the butting engagement). In such case, the end terminations of conductive path could be on bottom or on top as shown in FIGS. 1–1A or on both. Also, the magnetic drive is useful in multi-level measurements as described below.

The conductors may be of the same or different metal content. The substrate may be polyester, polyamide, polyimide and laminates of the same and with each other and with other plastics or even metals (separated from the conductive pattern by insulating layer 10. Alternatively, springy metals covered by plastic layers can be used. Alternatively, foil may be laminated to an insulating substrate and die cut or etched to establish the zig-zag conductive patterns shown. At the bottom of zig-zag portions, a bridging connector 22 connects them so that they form a single elongated conductive path. At a lower end the individual sinuous conductors are also connected by lamination forced contact pressure, connection or folding to achieve proper length for the liquid enclosing vessel. At the upper ends of the zig-zag conductors connection points A and B are provided. The spring like sheet material 10 is preferably 1–5, preferably 3 mil polyethylene terephthalate, e.g., E.I. DuPont Corporation's mylar brand polyester, and the metal coating is preferably 0.1–1.0 or preferably 0.2 mils constantan, average width of the conductive paths 18 and 20 being about 10 to 60 mils.*

*FIG. 1B shows a preferred form of zig-zag pattern of conductors 20B and 18B (in phantom)

Typical current ratings of the power supply are in 1–100 milliampere range and resistance are on the order of 2–100 ohms per inch so that for 1 milliampere, 1,000 inch, full voltage drop is 1 volt, easily measurable on an economical voltmeter.

Figure 2:
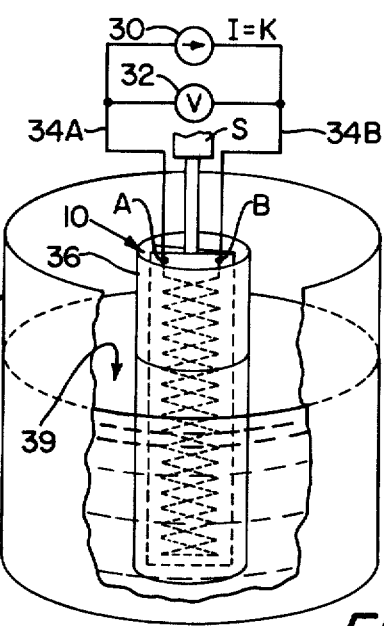
FIG. 2 is a partially cut away isometric view of a liquid containing tank with a transducer according to a preferred embodiment of the invention extending therein and showing the electrical power supply therefor.

FIG. 2 shows the above described folded sheet material (according to any of the various forms thereof described above) enclosed in a protective liquid resistant flexible sheet 36 and suspended by suspending means S, of conventional form per se, in a tank 38 which has a liquid level 39 to be measured. Circuitry for providing a measuring current and measuring the voltage drop produced across the non-shorted out portions of the conductive paths, comprises a constant current generating source 30 and a volt meter 32 connected by a lead 34A and 34B to terminals A and B of the folded sheet material.

Figure 3:
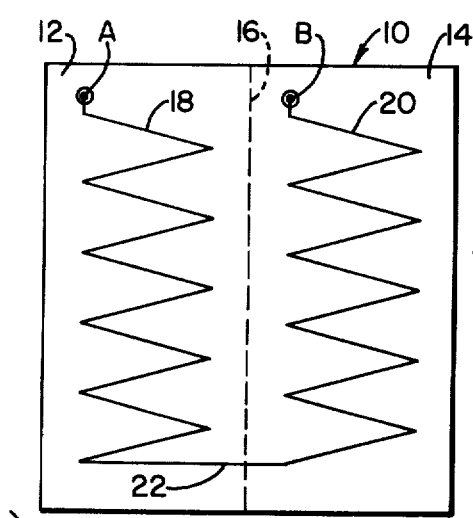
FIG. 3 is an exploded view of three portions of materials according to a second complete embodiment of the invention.

FIG. 3 shows a further embodiment of the invention wherein an insulating material sheet 40 with holes 42 is placed within the folded sheet material 10 with holes 42 aligned with the interceptions of conductors 18 and 20. This is particularly useful in connection with non-linear formula zig-zag arrangements to prevent butting contact in the 12S – 14S regions and to otherwise prevent spurious signals.

Figure 4:
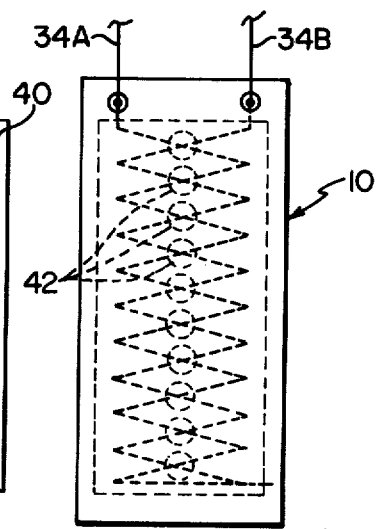
FIG. 4 is a plan view of a portion of a third preferred embodiment of the invention.

FIG. 4 shows such an interleaved insulator sheet 40A with a graded series of holes 42A which vary from largest at the lowest pressure region (i.e., highest in height) to smallest area at the highest pressure region (lowest in height within the liquid). To provide a measure of gauge pressure, the lever arms M-C from the edges of the largest holes to the X-intersections of conductors (substantially at hole centers) are greatest at the larger holes 42A and these will respond more readily to an externally applied pressure or other force (via liquid or gas or solid ram or weight) to make electrical contact at the intersection than will be the case at the smaller holes. This embodiment may be used to measure velocity head of a flowing liquid and other relative quantities.*

*The transducer is arranged in the usual tap pipe across a flow measuring venturi nozzle to respond to the differential of pressures upstream and downstream of the venturi.

Figure 5:
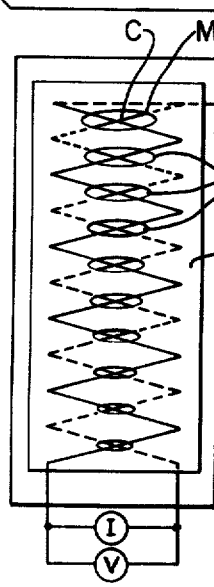
FIGS. 5 and 6 are schematic diagrams of further preferred embodiments of the invention.
Figure 5:
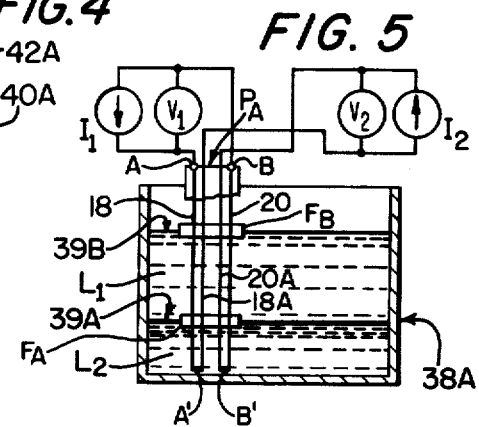

FIG. 5 shows a two-current source ($I_1$ and $I_2$) embodiment of the invention with currents in the same direction and producing a voltage addition $V_1 + V_2$ based on voltage drops through conductors 18 and 20 in circuit therebetween a probe $P_A$ which comprises a folded (but not butting at the faces to form the X-intersections) sheet as described in connection with FIGS. 1–3 above. Measurement is shown in a tank 38A containing two fluids $L_1$ and $L_2$ of different densities with levels at 39A and 39B, respectively. Fut the two (or more) current source arrangement would also be used in a one liquid level measurement task as indicated in FIG. 2 above. Conductors 18A and 20A of negligible resistance compared to 18 and 20 provide contact to 18 and 20 at terminations A',B'.

The additive voltage drop readings of $V_1$ and $V_2$ can be used to determine level of one or both of liquids $L_1$ and $L_2$ in FIG. 5.

Floats $F_A$ and $F_B$ containing magnets can be used to determine levels 39A and 39B. Probe $P_A$ has a stiff non-collapsing shield surrounding the conductors (rather than the flexible force transmitting sheath of FIG. 2) and iron filings on the folded sheet 10 (either within the conductors 18, 20 or separate therefrom). The iron filings closest to floats $F_A$, $F_B$ cause butting engagement to produce X-intersection shorting out so that $V_1$ has a voltage drop reflecting height 39B and $V_2$ has a voltage drop reflecting height 39A. The depth of liquid $L_1$ is then inferentially determined.

Figure 6:
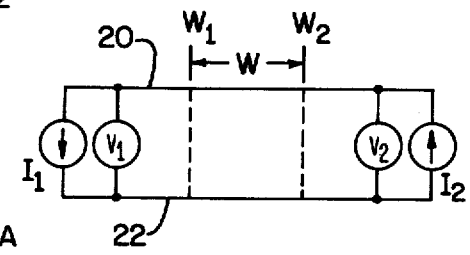

FIG. 6 shows the FIG. 5 circuit laid out flat and used to measure the width of W of an object compressing the folded sheets containing conductors 20 and 18 for intersection (e.g., at $W_1$ and $W_2$ for wheels of a car or truck whose width is to be measured). The voltage drop sum, $V_1 + V_2$ is correlatable to width W. It can also be used for motorcycles or other one zone short-outs (e.g., by foot pressure to product butting and X-intersection) to determine locations of passing vehicles or personnel (e.g., for intrusion detection.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Pressure detection apparatus comprising,
   a transducer element for immersion in a pressure medium, or a fluent environment or subjection to a like activating force, comprising means defining an extended length of springy lengthwise folded sheet material for extending into the pressure medium with its folded portions contacting each other face to face at portions exposed to a pressure above a predetermined threshold on the backs of said folded portions or other activating force,
   the springy character of the folded sheet material and geometric loading arrangement holding the folded portions apart in other portions thereof,
   means defining elongated conductors on opposing front faces of the folded portions comprising a periodic zig-zag waveform conductive path on each facing portion of the folded sheet arranged in complementary form so that the two conductive paths for X intersections to short out the conductive paths by butting contact wherever the facing portions are pressed together, so that the remaining portions of the conductive paths define resistive lengths in a circuit to the extent they are not essentially shorted out of said circuits by butting contact with each other, and means for applying an electric current to the conductors and for measuring a parameter of said circuit as an indication of the pressure or other activating force which presses the portions together, and wherein an insulator sheet with openings is placed between the folded portions.

2. Pressure transducer apparatus in accordance with claim 1 wherein the zig-zag form is linearly periodic.

3. Pressure transducer apparatus in accordance with claim 1 wherein the zig-zag form is non-linearly periodic.

4. Pressure apparatus in accordance with claim 1 wherein the sheet material is contained in a flexible sealed wrap and the butting contact for shorting out is produced by fluid pressure or other force on the back side of the folded sheet material.

5. Pressure apparatus in accordance with claim 1 wherein the sheet material is contained in a rigid sheath and the butting contact for shorting out is produced by a supplementary drive.

6. Pressure apparatus in accordance with claim 5 wherein the supplementary drive is an external magnet movable by the pressure medium or other activating force and coacting with magnetic material within the folded sheet.

7. Pressure detection apparatus in accordance with claim 1 wherein the openings are in a graded series of size to provide relative measurement such as gauge pressure, hydraulic head or the like.

8. Pressure detection apparatus in accordance with claim 1 constructed and arranged as a liquid level control.

9. Pressure detection apparatus in accordance with claim 8 in combination with a liquid container and means for suspending the said transducer element substantially vertically along its folded length with the shorted out portions defining liquid level height.

* * * * *